United States Patent Office 2,792,417
Patented May 14, 1957

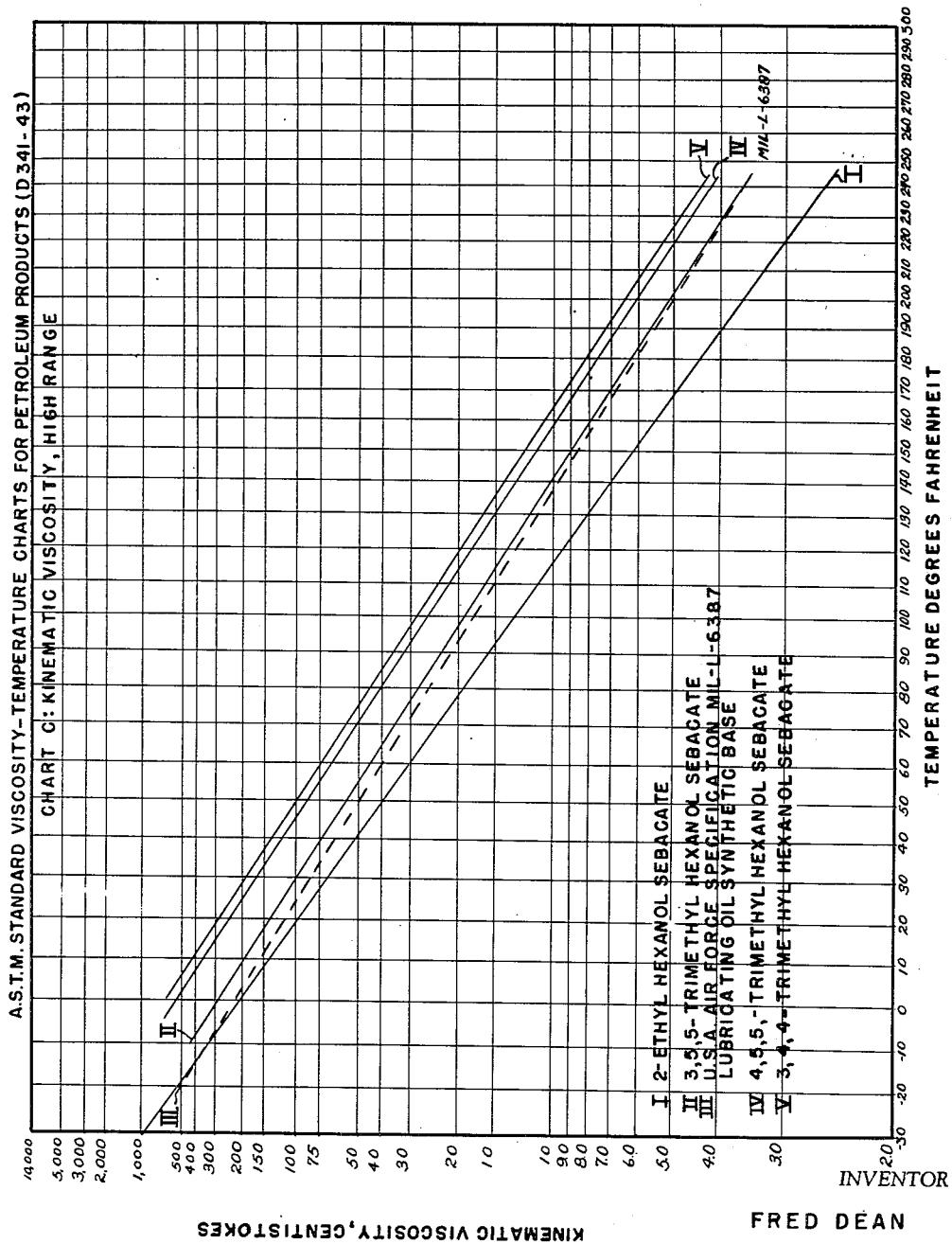

---

2,792,417

PRODUCTION OF NONYL ALCOHOLS AND ESTERS THEREOF

Fred Dean, Norton-on-Tees, England, assignor to Imperial Chemical Industries Limited, London, England, a corporation of Great Britain Application July 31, 1956, Serial No. 601,214

8 Claims. (Cl. 260—475)

---

This invention relates to the production of 3,4,4- and 4,5,5-trimethylhexanol-1 and to their esters, and is a continuation-in-part of my co-pending application Serial No. 240,615 filed August 6, 1951, now abandoned.

According to a feature of the present invention trimethylhexanols-1 in which the three methyl groups are attached to two consecutive carbon atoms are produced by reacting trimethyl pentenes-1 or -2 in which the three methyl groups are in the 2,3,3- or 3,4,4- positions with hydrogen and carbon monoxide in the presence of cobalt as catalyst in the liquid phase under superatmospheric pressure and at elevated temperature and hydrogenating the resulting aldehydes. The resulting alcohols may be separated by fractional distillation. Suitable hydrocarbons comprise 3,4,4-trimethylpentene-1 or 3,4,4-trimethylpentene - 2; and 2,3,3 - trimethylpentene - 1. 4,5,5 - trimethylhexanol-1 is obtained from each of the first two olefines; and 3,4,4-trimethylhexanol-1 from the last mentioned olefine.

As a further feature of the invention these olefines may be separately prepared, for example, by fractional separation, and carbonylated to give the corresponding substantially pure aldehyde, and the latter hydrogenated. A suitable catalyst to employ for the hydrogenation step is copper-on-zinc oxide or copper-on-chromia, and it is preferred to decompose metal carbonyl and expel carbon monoxide from the carbonylation product, e. g., by treatment with hydrogen, before hydrogenating to the alcohol. In the carbonylation step it is preferred to employ a soluble cobalt catalyst such as cobalt naphthenate, acetate, hexahydrobenzoate or trimethyl hexanoate.

Suitable reaction conditions for the carbonylation step are 130° to 190° C., preferably 150° to 175° C., and 200 to 300 atmospheres gauge: and suitable conditions for the hydrogenation step e. g., 250° C. and 240 atmospheres gauge.

If it is desired to produce each of the aforesaid alcohols in substantially pure form, one may start from individual octene fractions which have been obtained by precision distillation of mixed olefines, obtained for example by cracking of petroleum or by the dimerisation of lower olefines obtained, for example, by the dehydrogenation of paraffins. Alternatively, mixed olefines may be employed and the resulting alcohols may be isolated by precision distillation. However, precision distillation tends to be costly and for many commercial uses mixed alcohols are suitable. Hence there is also included within the scope of the invention a process for the production of mixtures of the aforesaid trimethylhexanols-1 from mixed octenes.

The alcohols are of value as anti-foaming agents and as intermediates for the production of plasticiser esters, the corresponding octadecanols, thiocyanates (useful as insecticides), ethers and amines (useful as surface active agents).

It is believed that the aforesaid two alcohols are novel compounds and their characteristics are given in Table 1.

Table 1

| Alcohol | B. Pt. at 760° C. | Vapour Pressure Constants[1] | | Refractive Index, $n_D^{20}$ | Density, $n_4^{20}$ | Viscosity, Centipoises at 20° C. |
|---|---|---|---|---|---|---|
| | | A | B | | | |
| 3,4,4-trimethyl-hexanol-1 | 206.5 | 8.770 | 2,824 | 1.4450 | 0.8589 | 23.7 |
| 4,5,5-trimethyl-hexanol-1 | 202.0 | 8.590 | 2,712 | 1.4390 | 0.8453 | 22.7 |

[1] A and B are defined by the equation $\log_{10} P = A - \frac{B}{T}$.

P being the vapour pressure in mms. of mercury at absolute temperature T.

Valuable esters such as sebacates, adipates and maleates may be produced from these novel alcohols and are useful as plasticisers, synthetic lubricants, penetrating oils, indicator fluids, brake fluids. The sebacates especially are of value as components of synthetic lubricants. The normal phthalates of these alcohols, which are believed to be novel, are of particular value since they have viscosities considerably higher than di-3,5,5-trimethylhexyl phthalate. These phthalates are particularly useful as plasticisers for polyvinyl chloride. By the term "normal ester" is meant in this specification one in which all the replaceable hydrogen atoms of the acid are replaced by alkyl radicals; and by the term "mixed ester" is meant an ester in which the replaceable hydrogen atoms of the acid are replaced by different alkyl radicals.

The novel phthalates may be produced by standard methods, such as, for example, heating the alcohol with phthalic anhydride in the presence of a hydrocarbon solvent, e. g., toluene, and of an acid catalyst, e. g., sulphuric or an organic sulphonic acid, and in the substantial absence of water, e. g., by removing the latter as a heterogeneous azeotrope with the hydrocarbon. They are, however, preferably prepared by the method described in British specification No. 667,109.

The improved properties of these novel nonyl phthalates over other phthalates such as di-3,5,5-trimethylhexyl phthalate or di-3,4,5-trimethylhexyl phthalate, especially their high viscosity, is well brought out in Table 2 which also gives a number of their more important characteristics.

If desired, mixed esters or complex mixtures of such mixed esters may be used and the properties of one such mixture of 4,5,5-trimethylhexanol-1, 3,4,5-trimethylhexanol-1 and 3,4,4-trimethylhexanol-1 phthalates is shown under item 4 in this table. By phthalating a mixture of specific alcohols, normal esters containing desired differing alkyl groups can be produced. All these esters have higher viscosities than the normal ester of 3,5,5-trimethylhexanol.

Table 2

| No. | Ester | Sap. Value, mgs. KOH | Refractive Index, $n_D^{30}$ | Density, $n_4^{20}$ | Viscosity, at 20° C. Centipoises |
|---|---|---|---|---|---|
| 1 | Di-3,4,4-trimethylhexyl phthalate | 267 | 1.4932 | 0.9951 | 353 |
| 2 | Di-3,4,5-trimethylhexyl phthalate | 267 | 1.4920 | 0.9749 | 167 |
| 3 | Di-4,5,5-trimethylhexyl phthalate | 267 | 1.4900 | 0.9803 | 221 |
| 4 | Phthalate from mixture of 1, 2, and 3 in proportions ca. 45:30:25. | 267 | 1.4890 | 0.9822 | 172 |
| 5 | Di-3,5,5-trimethylhexyl phthalate. | 267 | 1.4825 | 0.969 | 96 |
| 6 | Di-2-ethylhexylphthalate. | 287 | 1.4858 | | <96 |

As already mentioned the sebacates, that is the disebacates, especially are of value as synthetic lubricants. Their value is brought out by the data given in Table 3, which shows also exactly comparable data for the disebacates of 3,5,5-trimethyl hexanol-1 and of 2 ethyl hexanol which are accepted as high quality lubricants, and those corresponding to U. S. A. Air Force Specification MIL–L–6387 (Lubricating Oil Synthetic Base). The data for 2-ethyl hexanol disebacate and for MIL–L–6387 (Lubricating Oil Synthetic Base) are taken from the pamphlet entitled, "Emery Esters for Synthetic Lubricants," issued by the Development and Service Department of Emery Industries Inc., Cincinnati, issued in October 1951.

Table 3

| Compound or specification | Viscosity in centistokes at— | | | | | | Refractive Index | | Density $d_4^{20}$ |
|---|---|---|---|---|---|---|---|---|---|
| | −40° F. | 70° F. | 100° F. | 130° F. | 170° F. | 210° F. | $n_D^{20}$ | $n_D^{25}$ | |
| 3,5,5-trimethyl hexanol disebacate | | 34.2 | 18.8 | 11.7 | 7.0 | | | | |
| 2-ethyl hexanol disebacate | 1,410 | | 12.6 | | | 3.32 | | | |
| MIL–L–6387 (Lubricating Oil Synthetic Base) | | (35) | (17.7) | (11.1) | (6.7) | | | | |
| 3,4,4-trimethyl disebacate | | 57.5 | 28.7 | 16.7 | 9.2 | | 1.4604 | 1.4583 | 0.9262 |
| 4,5,5-trimethyl hexanol disebacate | | 50.5 | 25.9 | 15.1 | 8.5 | | 1.4562 | 1.4544 | 0.9170 |

These data are graphed in the accompanying figure and prove that the improvement in viscosity characteristics shown by the disebacates of 3,4,4-trimethyl hexanol-1 and 4,5,5-trimethylhexanol-1 over the other compounds or specifications is highly significant and that the novel disebacates are improved lubricants and lubricant components of great value.

The invention is illustrated by the following examples.

EXAMPLE 1

A fraction rich in 3,4,4-trimethylpentene-2 obtained by precision fractional distillation of $C_8H_{16}$ hydrocarbons produced by the dimerisation of dehydrogenated mixed butanes was carbonylated in a chrome steel reactor in the liquid phase at 250 atmospheres gauge and 150° to 170° C. with a gas having a CO:$H_2$ ratio of 2:3 using cobalt naphthenate as catalyst and a liquid space velocity of 0.5 litre of olefine per litre of reaction space per hour.

The carbonylation product was stripped of carbon monoxide and cobalt carbonyl was decomposed by treatment with hydrogen, and it was then filtered. The filtrate was hydrogenated at 250° C. and 250 atmospheres gauge over a copper-on-zinc oxide catalyst. The resulting crude alcohol was dried, filtered and subjected to precision fractional distillation according to the method described in British Patent No. 578,309, using a 16″ x 1″ diameter column packed with gauze rings and a reflux ratio of 80:1 while approaching ranges of constant boiling point and a reflux ratio of 40:1 while in ranges of constant boiling point.

The fraction boiling at 202.4° C. and having $n_D^{20}$ 1.4406 was crude 4,5,5-trimethylhexanol-1. On refractionating this material there was obtained substantially pure 4,5,5-trimethylhaxanol-1 having a boiling point of 202° C. and $n_D^{20}$ of 1.4390.

EXAMPLE 2

4,5,5-trimethylhexanol-1 was reacted with phthalic anhydride in the molar ratio 3:1 in the presence of 2% of finely divided active alumina calculated on the weight of the alcohol. The reaction mixture was refluxed at 185° to 210° C. in a boiler provided with a condenser and decanter and the water formed in the reaction was entrained and removed in the excess of alcohol. The condensed mixture was separated into two layers in the decanter and the alcohol rich layer was returned to the column.

Reaction was complete after about 5 hours and the residual mixture was filtered, washed with 0.4% aqueous caustic soda, and then with distilled water. The washed ester was subsequently steam distilled to remove excess alcohol and was dried with sodium sulphate.

The ester, which was substantially pure di-4,5,5-trimethylhexyl phthalate had the characteristics given in Table 2 of this specification.

EXAMPLE 3

To a mixture of 331 gms. of 3,4,-trimethylhexanol-1 obtained by carbonylating 2,3,3-trimethylpentene-1, and 460 grams of toluene, contained in a glass reaction flask and precooled to 0° C. was gradually added dropwise 0.53 ml. of 98% sulfuric acid to serve as esterification catalyst. 202 gms. of sebacic acid in powdered form was then introduced into the mixture, the flask was fitted with a decanter/reflux assembly, and heat was applied to bring the liquid to the boil. Heating was continued, whereby esterification proceeded and the water liberated in the reaction was continuously removed in the refluxing toluene. The temperature averaged 120° to 125° C. and the esterification was completed in about 2 hours.

The crude ester was cooled and washed with N/10 aqueous caustic soda used in a slight excess over that corresponding to the free acidity of the product. After removal of the excess caustic soda and of the sodium salts by extraction with warm water, the neutral product was steam stripped to remove the excess alcohol.

After drying over anhydrous magnesium sulphate there was obtained 433 gms. of di(3,4,4-trimethylhexyl)-sebacate, which was substantially pure: it had the characteristics given in Table 3 of this specification.

I claim:

1. As a new chemical substance, 3,4,4-trimethylhexanol-1.

2. As a new chemical substance 4,5,5-trimethylhexanol-1.

3. As a new chemical substance di(3,4,4-trimethylhexyl)phthalate.

4. As a new chemical substance di(4,5,5-trimethylhexyl)phthalate.

5. As a new chemical substance, a member selected from the group consisting of 3,4,4-trimethylhexanol-1 and 4,5,5-trimethylhexanol-1.

6. An ester selected from the group consisting of the diphthalate and normal sebacate esters of 3,4,4-trimethylhexanol-1 and 4,5,5-trimethylhexanol-1.

7. As a new chemical substance, the normal sebacate of 3,4,4-trimethylhexanol-1.

8. As a new chemical substance, the normal sebacate of 4,5,5-trimethylhexanol-1.

No references cited.